United States Patent
Kameta et al.

(10) Patent No.: US 10,642,250 B2
(45) Date of Patent: May 5, 2020

(54) SERVO CONTROL SYSTEM EQUIPPED WITH LEARNING CONTROL APPARATUS HAVING FUNCTION OF OPTIMIZING LEARNING MEMORY ALLOCATION

(71) Applicant: FANUC CORPORATION, Yamanashi (JP)

(72) Inventors: Kouki Kameta, Yamanashi (JP); Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 301 days.

(21) Appl. No.: 15/219,284

(22) Filed: Jul. 26, 2016

(65) Prior Publication Data
US 2017/0031349 A1 Feb. 2, 2017

(30) Foreign Application Priority Data
Jul. 31, 2015 (JP) .................. 2015-152874

(51) Int. Cl.
G05B 19/00 (2006.01)
G05B 19/408 (2006.01)
G05B 13/02 (2006.01)

(52) U.S. Cl.
CPC ..... *G05B 19/4083* (2013.01); *G05B 13/0265* (2013.01); *G05B 19/408* (2013.01); *G05B 2219/39376* (2013.01); *G05B 2219/41036* (2013.01); *G05B 2219/42151* (2013.01); *G05B 2219/42152* (2013.01)

(58) Field of Classification Search
None
See application file for complete search history.

(56) References Cited

U.S. PATENT DOCUMENTS

| | | | | |
|---|---|---|---|---|
| 2002/0159469 A1* | 10/2002 | Arimura | .................. | G11C 7/22 370/441 |
| 2006/0251064 A1* | 11/2006 | Yeh | .......................... | H04N 5/76 370/389 |
| 2012/0198267 A1* | 8/2012 | Das | ...................... | G06F 13/1605 713/600 |

FOREIGN PATENT DOCUMENTS

| | | |
|---|---|---|
| CN | 1700124 A | 11/2005 |
| JP | 61-147308 | 7/1986 |
| JP | 6-175865 A | 6/1994 |
| JP | 8-235004 A | 9/1996 |
| JP | 2928294 B2 | 8/1999 |
| JP | 2958978 B2 | 10/1999 |
| JP | 2005-11203 A | 1/2005 |

(Continued)

*Primary Examiner* — Paul B Yanchus, III
(74) *Attorney, Agent, or Firm* — Hauptman Ham, LLP

(57) ABSTRACT

A servo control system for controlling a plurality of axes of a machine tool, comprises: a plurality of servo control units for controlling the plurality of axes, respectively; a plurality of learning control units that are provided one each in the plurality of servo control units, and each configured to control a cyclic operation highly precisely; a common learning memory for storing correction data which at least a portion of the plurality of learning control units generates; a memory allocation unit for allocating at least a portion of a memory area in the learning memory to the axis that the learning control unit that generated the correction data controls; and a memory amount notifying unit for notifying the memory allocation unit as to the amount of memory that each of the plurality of learning control units of the respective axes requires.

4 Claims, 5 Drawing Sheets

(56) References Cited

FOREIGN PATENT DOCUMENTS

| | | |
|---|---|---|
| JP | 2007-11519 A | 1/2007 |
| JP | 2007-316702 A | 12/2007 |
| JP | 4043996 B2 | 2/2008 |
| JP | 2013-117932 A | 6/2013 |

* cited by examiner

SERVO CONTROL SYSTEM EQUIPPED WITH LEARNING CONTROL APPARATUS HAVING FUNCTION OF OPTIMIZING LEARNING MEMORY ALLOCATION

RELATED APPLICATIONS

The present application claims priority to Japanese Patent Application Number 2015-152874, filed Jul. 31, 2015, the disclosure of which is hereby incorporated by reference herein in its entirety.

BACKGROUND OF THE INVENTION

1. Field of the Invention

The present invention relates to a servo control system, and in particular to a servo control system that is equipped with a learning control apparatus which can optimize learning memory allocation.

2. Description of the Related Art

Learning control is known in which a servo control apparatus or a control system memorizes the relationship between a control method and its execution result and improves the control method based on the memorized result (for example, refer to Japanese Patent No. 4043996, hereinafter referred to as "patent document 1"). To implement such learning control, a memory used for learning must be secured. It is disclosed in patent document 1 that a learning control unit includes a so-called learning memory which stores correction data for one cycle of learning.

If there is no more than one axis to be controlled, one servo control unit and one learning memory will suffice for the purpose. On the other hand, if there is more than one axis to be controlled, one possible solution is to provide one learning memory for each of a plurality of servo control units. However, if, in a servo control apparatus for controlling a plurality of axes, a dedicated memory is allocated to a servo control DSP (Digital Signal Processor) for each axis, there is the problem that the cost increases correspondingly.

FIG. 1 shows a configuration example of a conventional art servo control apparatus for controlling a plurality of axes. A number, n, of servo control units (111, 112, 113, . . . ) are provided in order to control the plurality of axes, and learning control units (121, 122, 123, . . . ) and learning memories (131, 132, 133, . . . ) are provided, one each for each of the servo control units. Each learning memory is assumed to have a capacity x equivalent to maximum learning time.

There can occur a situation where some of the axes are axes (standard axes) for which learning control is not executed. In such a situation, the learning memories 132 and 133, for example, are not used for learning, and all of their memory areas remain unused; hence, there is a problem that the memories allocated to such axes are wasted.

Furthermore, the memory capacity necessary for learning varies depending on the content of the learning. However, each learning memory must be provided with a memory area sufficient to accommodate the maximum learning time. However, in this case, as in the learning memory 131, all of the memory area may be used for a learning axis A, while as in the learning memory 134, only a portion is used for a learning axis B and the remaining area remains unused. Therefore, when one learning memory is provided for each of the plurality of servo control units that control the plurality of axes, some of the memory areas remain unused, resulting in the problem that efficient use cannot be made of the learning memories. There has also been the problem that it is not possible to execute learning that takes longer than when the memory area of each of the learning memories provided in the respective servo control units can be accommodated.

SUMMARY OF THE INVENTION

It is an object of the present invention to provide a servo control system equipped with a learning control apparatus that can execute learning for an extended period of time by increasing the amount of learning memory allocation per axis, while making it possible to reduce the entire learning memory capacity compared with the configuration in which one learning memory is provided for each axis.

A servo control system according to one embodiment of the present invention is a servo control system for controlling a plurality of axes of a machine tool or the like, and comprises: a plurality of servo control units for controlling the plurality of axes, respectively; a plurality of learning control units which being provided one each in the plurality of servo control units, and being each configured to control a cyclic operation highly precisely; a common learning memory for storing correction data which at least a portion of the plurality of learning control units generates; a memory allocation unit for allocating at least a portion of a memory area in the learning memory to the axis that the learning control unit that generated the correction data controls; and a memory amount notifying unit for notifying the memory allocation unit as to the amount of memory that each of the plurality of learning control units of the respective axes requires.

BRIEF DESCRIPTION OF THE DRAWINGS

The above and other objects, features, and advantages of the present invention will become more apparent from the description of the preferred embodiments as set forth below with reference to the accompanying drawings, wherein.

DETAILED DESCRIPTION

A servo control system according to the present invention will be described below with reference to the drawings.

First Embodiment

Figure 1:
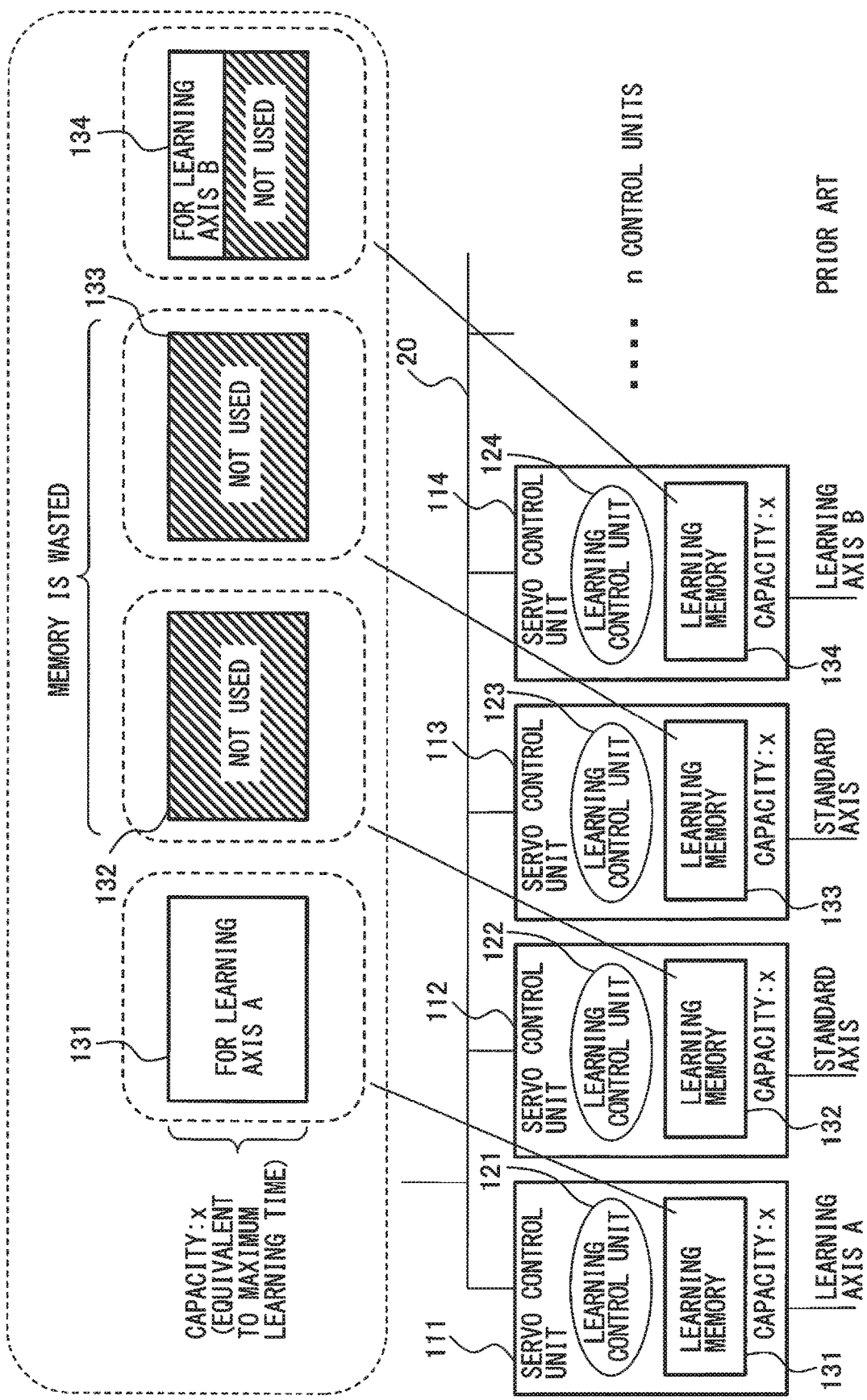
FIG. 1 is a diagram showing the configuration of a conventional art servo control system.
Figure 2:
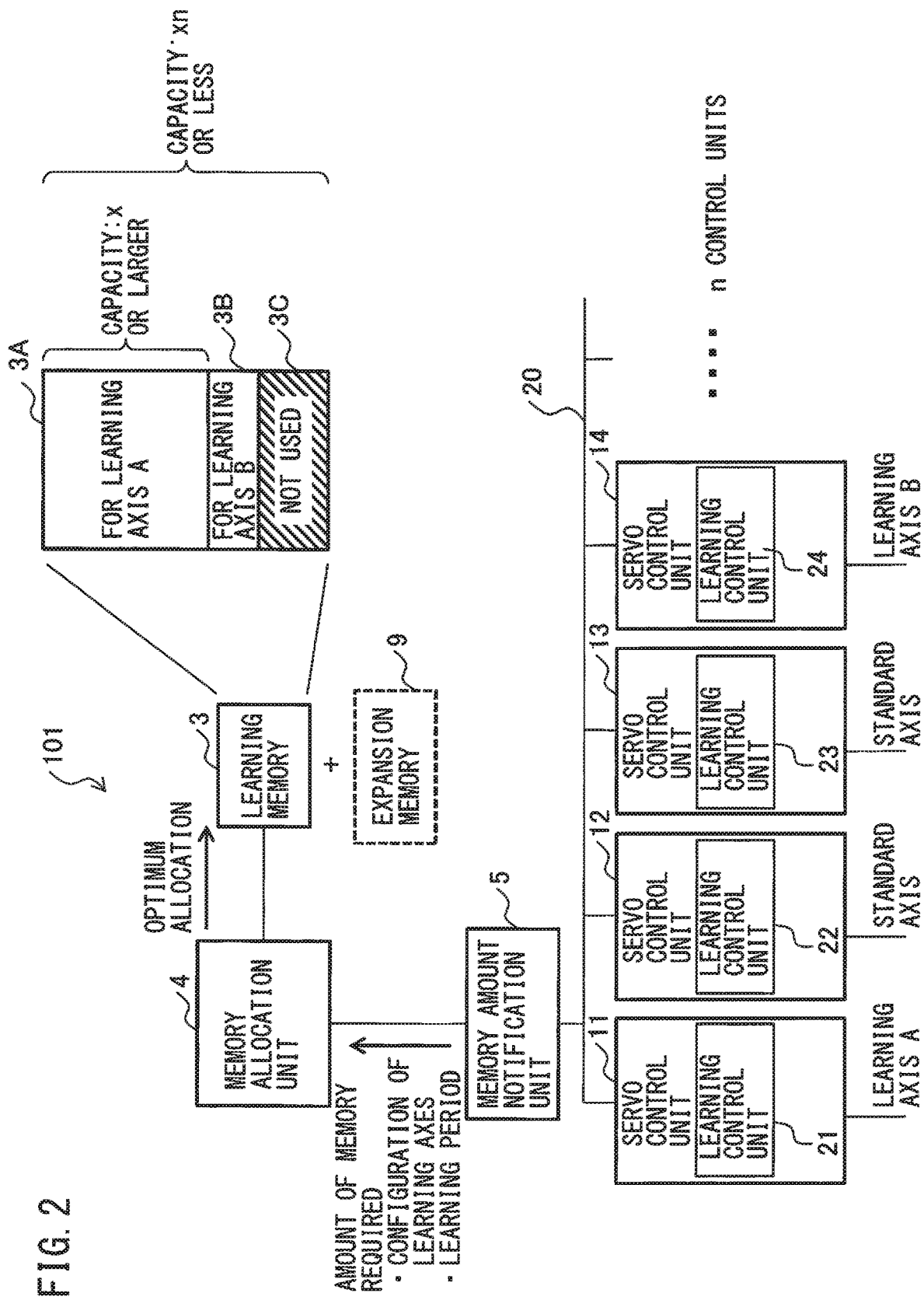
FIG. 2 is a diagram showing the configuration of a servo control system according to a first embodiment of the present invention.

A servo control system according to a first embodiment of the present invention will be described. FIG. 2 shows the configuration of the servo control system according to the first embodiment of the present invention. The servo control system 101 according to the first embodiment of the present invention is a servo control system for controlling a plurality of axes of a machine tool or the like, and comprises a plurality of servo control units (11, 12, 13, ... ), a plurality of learning control units (21, 22, 23, ... ), a common learning memory 3, a memory allocation unit 4, and a memory amount notifying unit 5. The plurality of servo control units (11, 12, 13, ... ) control the plurality of axes, respectively. The plurality of learning control units (21, 22, 23, ... ) are provided one each in the plurality of servo control units, and are each configured to control a cyclic operation highly precisely. The common learning memory 3 stores correction data which at least a portion of the plurality of learning control units generates. The memory allocation unit 4 allocates at least a portion of a memory area in the learning memory to the axis that the learning control unit that generated the correction data controls. The memory amount notifying unit 5 notifies the memory allocation unit as to the amount of memory that each of the plurality of learning control units of the respective axes requires.

The plurality of (for example, n) servo control units (11, 12, 13, ... ) control the respective axes. For example, the servo control unit 11 controls a learning axis A, and the servo control unit 14 controls a learning axis B. A description will be given below by taking as an example the case in which the axes that the servo control units 12 and 13 control are standard axes for which learning control is not executed.

In the servo control unit 11, the learning control unit 21 executes learning control for the learning axis A, and in the servo control unit 14, the learning control unit 24 executes learning control for the learning axis B. On the other hand, neither the learning control unit 22 in the servo control unit 12 nor the learning control unit 23 in the servo control unit 13 executes learning control. Then, to execute learning control, the learning control units 21 and 24 need to generate and store correction data. In the present invention, rather than providing a storage unit for each individual learning control unit that executes the learning control, the learning memory 3 is shared among the plurality of learning control units, and the correction data are stored in the learning memory 3.

The memory allocation unit 4 allocates at least a portion of the memory area in the learning memory 3 to each of the learning axes A and B that the learning control units 21 and 24 that generated the correction data control. In the illustrated example, a memory area 3A as a portion of the learning memory 3 is allocated to the learning axis A, while a memory area 3B is allocated to the learning axis B.

When the capacity required of the conventional art learning memory is denoted by x, the capacity of the learning memory 3 according to the present invention can be reduced to equal to or less than the capacity x multiplied by the number n (x×n). This is because all the axes for which learning control is executed do not necessarily require a memory capacity equivalent to maximum learning time, and because there are also cases where some of the plurality of axes are standard axes for which learning is not executed. Furthermore, if there occurs an unused area 3C in the remaining portion of the learning memory 3, the memory area for the learning axis A can be increased beyond the conventional art capacity x.

To enable the memory allocation unit 4 to allocate the memory areas within the learning memory 3 as described above, the memory amount notifying unit 5 notifies the memory allocation unit 4 of how much memory each of the learning control units 21 and 24 that execute learning control requires, based on the configuration of the axes (learning axes) for which learning control is executed (for example, the learning axes A and B) and on the learning period.

The memory allocation unit 4 implements optimum allocation of the learning memory 3 in accordance with the notification from the memory amount notifying unit 5, and notifies the memory amount notifying unit 5 of how much memory is available for use. The learning control units 21 and 24 execute learning control for the respective learning axes A and B by using the respectively allocated memory areas 3A and 3B within the learning memory 3.

If a situation occurs where the capacity of the learning memory 3 is insufficient, the situation can be readily addressed by adding an expansion memory 9 to the learning memory 3.

As has been described above, in the present invention, information about "which axis needs learning control" and "how much memory the learning axis requires (how long is the learning period)" is acquired, and only the amount of memory required for the axis that needs learning is allocated in a flexible manner from the shared memory area. In this way, according to the present invention, the memory capacity can be reduced by ingeniously allocating the memory and avoiding wasteful memory allocation.

Second Embodiment

Figure 3:
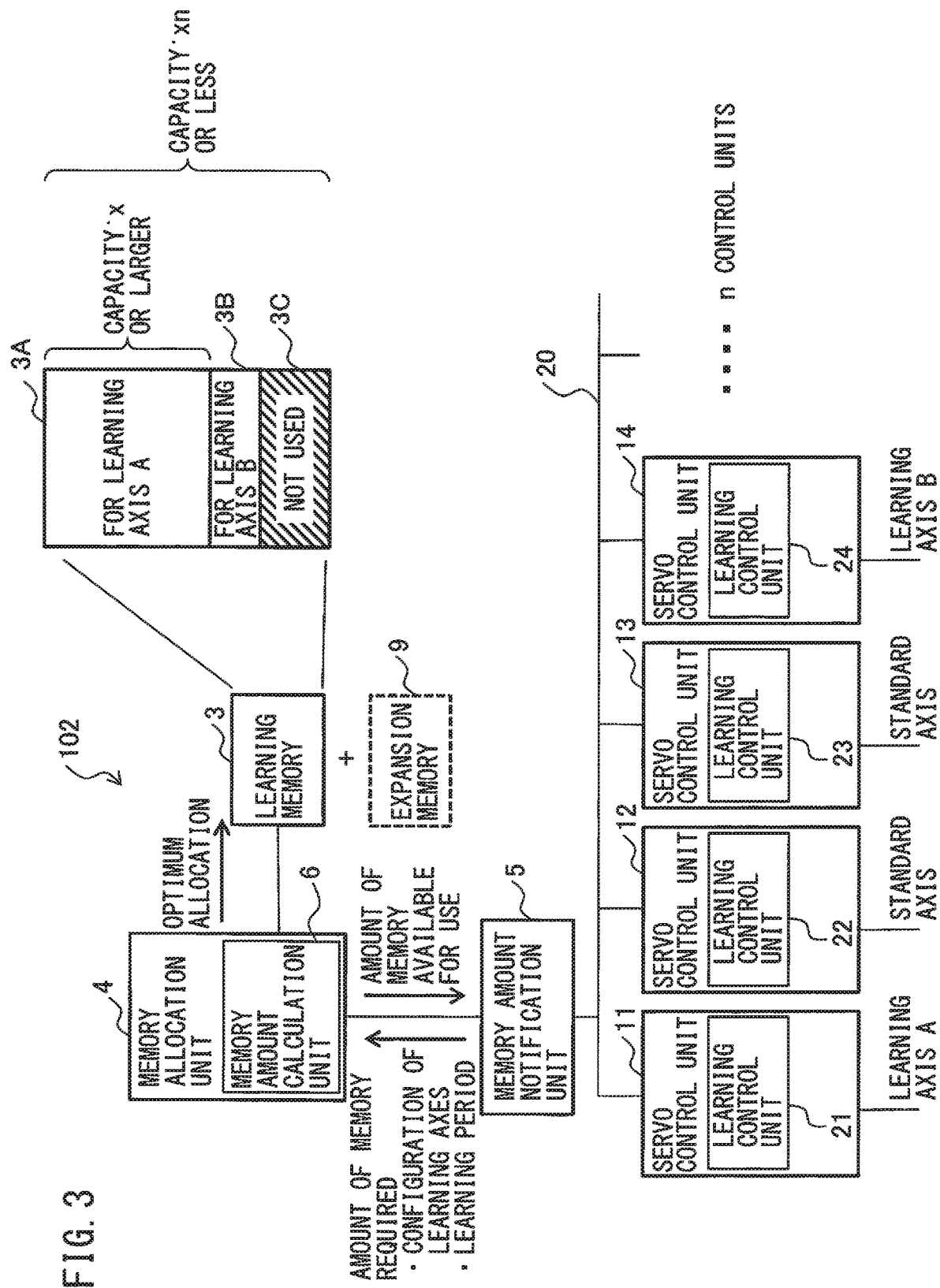
FIG. 3 is a diagram showing the configuration of a servo control system according to a second embodiment of the present invention.

A servo control system according to a second embodiment of the present invention will be described. FIG. 3 shows the configuration of the servo control system according to the second embodiment of the present invention. The servo control system 102 according to the second embodiment of the present invention differs from the servo control system 101 according to the first embodiment by the inclusion of a memory amount calculation unit 6 which calculates the amount of memory allocatable to each axis, based on the capacity of the common learning memory 3 and the required amount of memory for each axis notified by the memory amount notification unit 5, wherein the memory amount notification unit 5 notifies the learning control unit of each axis requiring the use of the learning memory 3 as to the amount of memory calculated by the memory amount calculation unit 6. Otherwise, the configuration of the servo control system 102 according to the second embodiment is the same as that of the servo control system 101 according to the first embodiment, and therefore, a detailed description of the configuration will not be repeated herein.

The memory amount calculation unit 6 can be provided, for example, within the memory allocation unit 4, as shown in FIG. 3. However, the configuration is not limited to the illustrated example, and the memory amount calculation unit 6 may be provided outside the memory allocation unit 4.

The memory amount calculation unit 6 acquires information about the capacity of the learning memory 3 from the learning memory 3 that is shared by the plurality of learning control units (21, 22, 23, ... ) provided in the plurality of servo control units (11, 12, 13, ... ) for driving the plurality of axes. Alternatively, the information may be acquired from an external system or the like that manages the memory.

The memory amount notification unit 5 computes the amount of memory needed to execute learning control in the plurality of learning control units (21, 22, 23, ... ), and notifies the memory amount calculation unit 6. For example, consider the case where the learning control is executed for the learning axes A and B and the other axes are standard axes for which learning control is not executed. In this case, the memory amount notification unit 5 notifies the memory amount calculation unit 6 as to the amount of memory that is needed for each axis in order to store the correction data generated when learning control is executed for the learning axes A and B, respectively.

The memory amount calculation unit 6 calculates the amount of memory allocatable to each axis, based on the required amount of memory for each axis notified by the memory amount notification unit 5. For example, when the total amount of memory required for the learning control of the learning axes A and B does not exceed the capacity of the learning memory 3, all the required memory is allocated in the learning memory 3. For example, the correction data for the learning axis A can be stored in the memory area 3A within the learning memory 3, while the correction data for the learning axis B can be stored in the memory area 3B within the learning memory 3. If, in this case, there occurs an unused area 3C in the learning memory 3, the amount of memory larger than the capacity x of the memory provided in each individual servo control unit of the conventional art can be allocated as the memory area 3A for the learning axis A.

Furthermore, if the capacity of the learning memory 3 is insufficient, then it can be readily addressed by adding an expansion memory 9 to the learning memory 3, as in the first embodiment.

As has been described above, according to the servo control system in the second embodiment of the present invention, since the system further includes the memory amount calculation unit 6, the amount of memory required for each of the plurality of learning control units can be appropriately allocated in the learning memory. Further, each learning control unit can properly recognize the remaining amount of memory based on the notification from the memory amount calculation unit 6.

Third Embodiment

Figure 4:
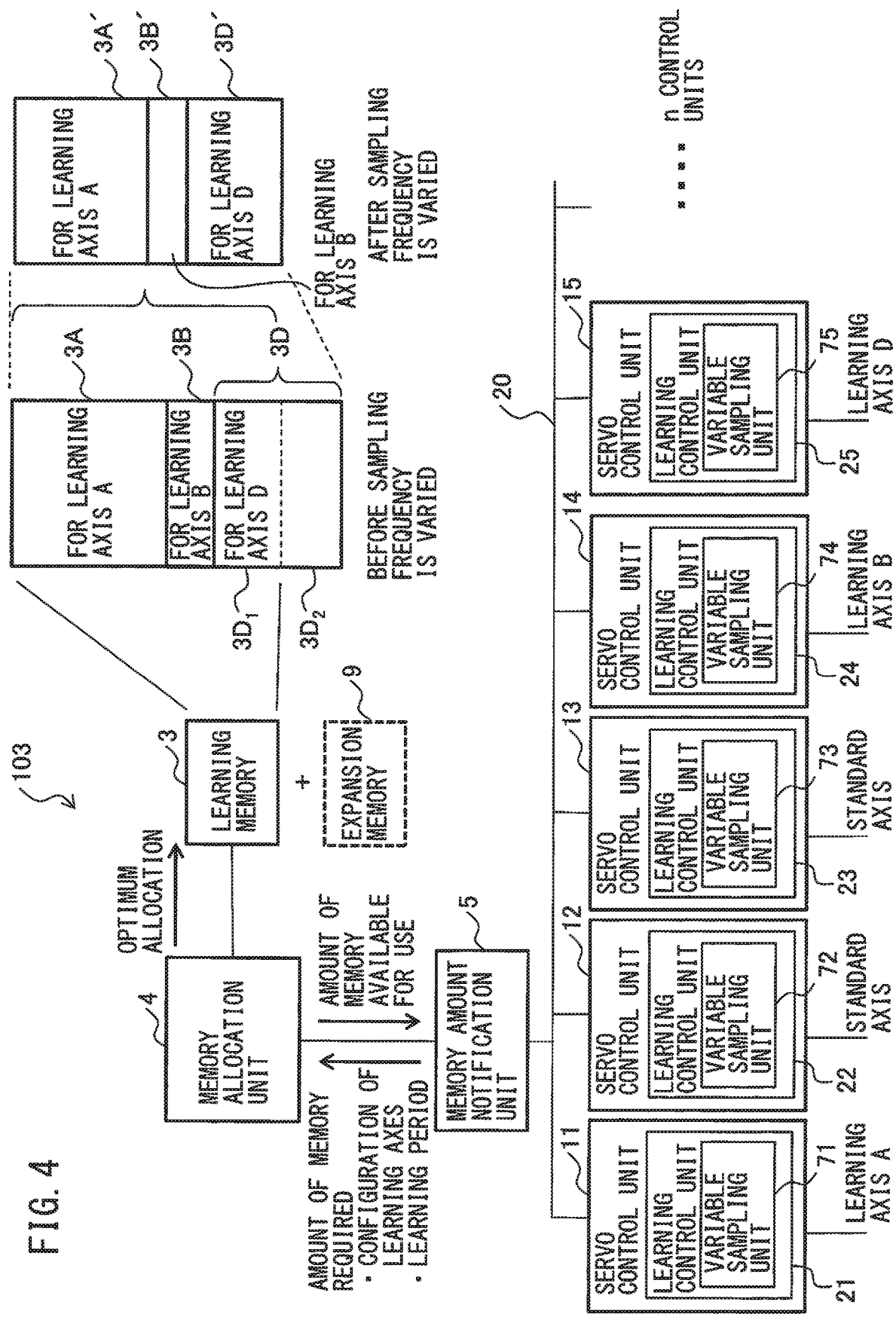
FIG. 4 is a diagram showing the configuration of a servo control system according to a third embodiment of the present invention.

A servo control system according to a third embodiment of the present invention will be described. FIG. 4 shows the configuration of the servo control system according to the third embodiment of the present invention. The servo control system 103 according to the third embodiment of the present invention differs from the servo control system 101 according to the first embodiment in that the plurality of learning control units (21, 22, 23, . . . ) include variable sampling units (71, 72, 73, . . . ), respectively, wherein each variable sampling unit adjusts the amount of correction data stored when executing learning control, based on the amount of memory that a corresponding one of the plurality of learning control units requires and on the amount of memory available for use in the learning memory 3. Otherwise, the configuration of the servo control system 103 according to the third embodiment is the same as that of the servo control system 101 according to the first embodiment, and therefore, a detailed description of the configuration will not be repeated herein.

A description will be given for the case where learning control is executed for the learning axes A, B, and D, as shown in FIG. 4. The learning control units 21, 24, and 25 that execute the learning control of the learning axes A, B, and D, respectively, each notify the memory amount notification unit 5 of the amount of memory required, and the memory allocation unit 4 allocates the necessary memory areas 3A, 3B, and 3D within the common learning memory 3.

It is assumed here that the total capacity of the memory areas 3A and 3B necessary for the learning control of the learning axes A and B is smaller than the total capacity of the learning memory 3, but that when the memory area 3D necessary for the learning control of the learning axis D is added, the required total capacity exceeds the total capacity of the learning memory 3. More specifically, when the memory area 3D necessary for the learning control of the learning axis D is divided into $3D_1$ and $3D_2$, the total amount of the memory areas 3A, 3B, and $3D_1$ is equal to the storage capacity of the learning memory 3, and the total amount of memory required exceeds the storage capacity of the learning memory 3 by an amount equal to the memory area $3D_2$.

The memory allocation unit 4 notifies the memory amount notification unit 5 that the total amount of memory (3A+3B+3D) required for the learning axes A, B, and D exceeds the amount of memory available for use $(3A+3B+3D_1)$. More specifically, it is notified that the amount of memory to be used for the learning control should, for example, be reduced in accordance with a prescribed ratio $\alpha(=(3A+3B+3D_1)/(3A+3B+3D))$.

The memory amount notification unit 5 notifies the learning control units 21, 24, and 25 responsible for the learning control of the learning axes A, B, and D, respectively, that the amount of memory requested exceeds the amount of memory available for use in the learning memory 3, or that the amount of memory requested should be reduced in accordance with the prescribed ratio $\alpha$. The variable sampling units 71, 74, and 75 contained in the respective learning control units 21, 24, and 25 vary the sampling frequency so as to reduce the amount of correction data required.

The memory amount notification unit 5 notifies the memory allocation unit 4 of the reduced amount of memory to be used by the learning control units 21, 24, and 25. The memory allocation unit 4 allocates the reduced amount of memory after varying the sampling frequency as the new memory areas 3A', 3B', and 3D' for the learning axes A, B, and D so that the total amount of memory required does not exceed the capacity of the learning memory 3.

The method of varying the sampling frequency is not limited to the method of varying the sampling frequency so as to reduce the amount of correction data in accordance with a fixed ratio for the plurality of learning axes as described above. For example, the sampling frequency for each of the plurality of learning axes may be individually varied, or the sampling frequency only for a specified one of the learning axes may be varied.

Even when the sampling frequency is varied, if the capacity of the learning memory 3 is insufficient, it can be readily addressed by adding an expansion memory 9 to the learning memory 3, as in the first embodiment.

As has been described above, according to the servo control system in the third embodiment of the present invention, even when the amount of memory required for the learning control of the plurality of axes exceeds the capacity of the common learning memory, the learning control can be executed using the available capacity of the learning memory by varying the sampling frequency.

Fourth Embodiment

Figure 5:
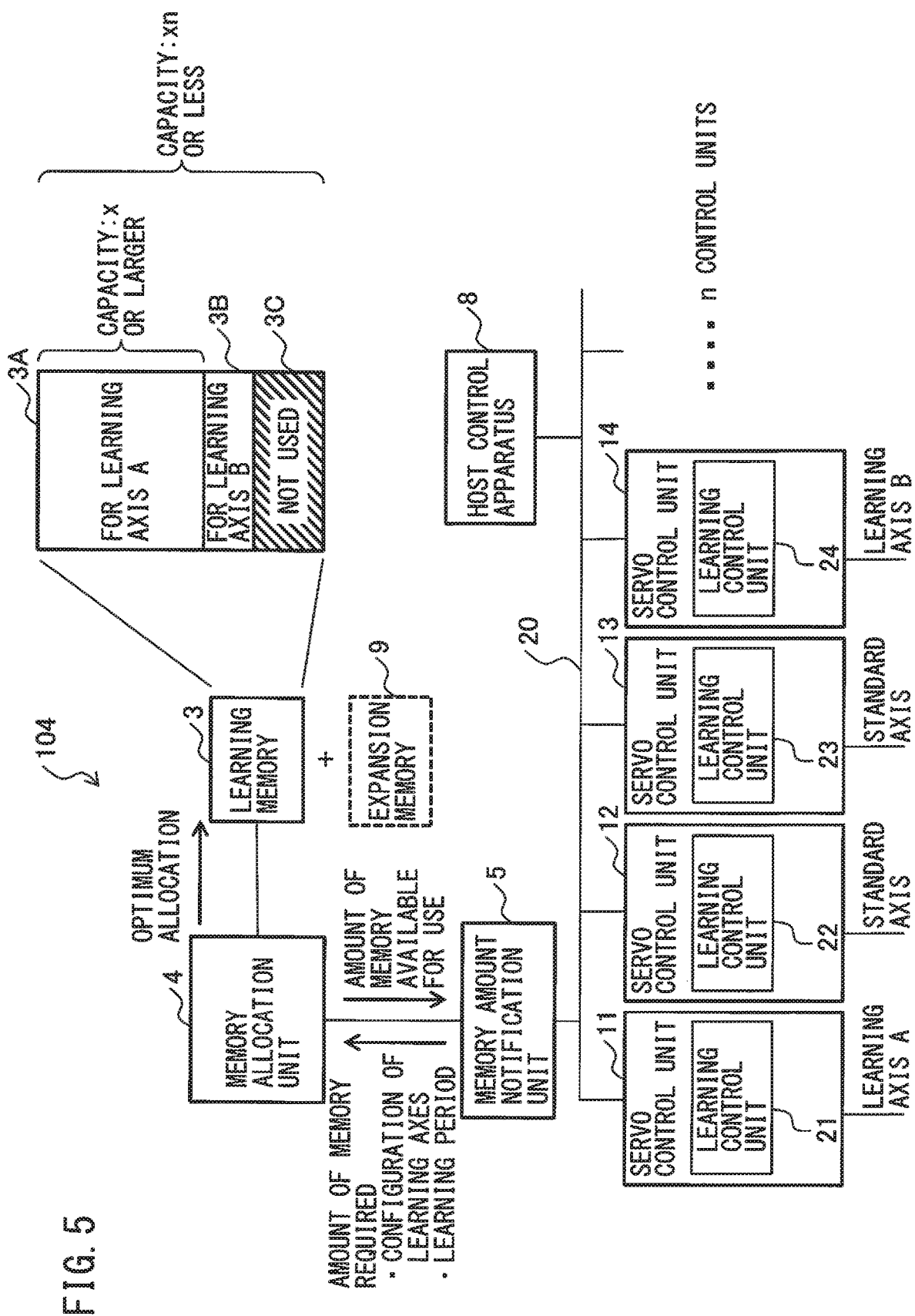
FIG. 5 is a diagram showing the configuration of a servo control system according to a fourth embodiment of the present invention.

A servo control system according to a fourth embodiment of the present invention will be described. FIG. 5 shows the configuration of the servo control system according to the fourth embodiment of the present invention. The servo control system 104 according to the fourth embodiment of the present invention differs from the servo control system 101 according to the first embodiment in that the memory amount notification unit 5 makes a notification about the amount of memory based on information provided from a host control apparatus 8, and dynamically changes the memory allocation based on a notification that the amount of memory has been varied. Otherwise, the configuration of the servo control system 104 according to the fourth embodiment is the same as that of the servo control system 101 according to the first embodiment, and therefore, a detailed description of the configuration will not be repeated herein.

In the servo control system 104 according to the fourth embodiment, the plurality of servo control units (11, 12, 13, ...) are connected to the host control apparatus 8 via a bus line 20. The host control apparatus 8 issues a command for controlling the plurality of servo control units. Depending on the content of the command, the content of the learning control of the respective axes may also be changed. Accordingly, the amount of memory required for the learning control of the respective axes may change depending on the information provided from the host control apparatus 8.

In that case, it is not desirable to interrupt the learning control of the respective axes to vary the amount of memory as the information from the host control apparatus 8 changes. In view of this, provisions are made in the servo control system according to the fourth embodiment so as to dynamically change the memory allocation and secure the necessary memory area while continuing to execute the learning control.

Suppose, for example, that during the process of the learning control of the learning axes A and B, the standard axis in the servo control unit 12 is changed to a learning axis based on a command from the host control apparatus 8. In this case, it is assumed that, of the memory areas in the learning memory 3, the memory areas 3A and 3B are used but the memory area 3C remains unused. The memory allocation unit 4 allocates a portion of the memory area 3C as a memory area that becomes necessary when the standard axis in the servo control unit 12 is changed to a learning axis. In this way, the standard axis can be changed to a learning axis without incurring any changes in the memory areas 3A and 3B and without interrupting the learning control of the learning axes A and B.

As has been described above, according to the servo control system in the fourth embodiment of the present invention, since the memory allocation is dynamically changed based on the information provided from the host control apparatus, any change in the content of operation during the learning control can be appropriately addressed as the change occurs.

According to any of the embodiments of the present invention, it is possible to provide a servo control system equipped with a learning control apparatus that can execute learning for an extended period of time by increasing the amount of learning memory allocation per axis, while making it possible to reduce the entire learning memory capacity compared with the configuration in which one learning memory is provided for each axis.

The invention claimed is:

1. A servo control system for controlling a plurality of axes of a machine tool, comprising:
   a plurality of servo control units for controlling the plurality of axes, respectively;
   a plurality of learning control units each being provided in one of the plurality of servo control units, and each being configured to control a cyclic operation highly precisely;
   a common learning memory for storing correction data generated by at least a portion of the plurality of learning control units; and
   a processor configured to
      allocate at least a portion of a memory area in the learning memory to the axis that the learning control unit that generated the correction data controls, and
      notify as to an amount of memory that each of the plurality of learning control units of the respective axes requires,
   wherein each of the plurality of learning control units comprises a variable sampling unit which is configured to:
      adjust an amount of the correction data stored in the common learning memory when executing learning control, based on the amount of memory, and
      vary a sampling frequency.

2. The servo control system according to claim 1, wherein the processor is further configured to
   calculate the amount of memory allocatable to each axis, based on a capacity of the common learning memory and the required amount of memory for each axis, and
   notify the learning control unit of each axis requiring the use of the learning memory as to the amount of memory calculated by the processor.

3. The servo control system according to claim 1, wherein each of the plurality of learning control units is configured to adjust the amount of correction data stored in the learning memory when executing the learning control, based on the amount of memory that the learning control unit requires and on the amount of memory available for use in the learning memory.

4. The servo control system according to claim 1, wherein the processor is further configured to
   make a notification about the amount of memory based on information provided from a host control apparatus, and
   dynamically change memory allocation and secure necessary memory area,
while the plurality of learning control units continuing to execute learning control, based on a notification that the amount of memory has been varied, and
wherein the amount of memory required for the learning control of the respective axes changes depending on the information provided from the host control apparatus.

* * * * *